L. PEIRCE.
Roofing.
No. 205,132. Patented June 18, 1878.
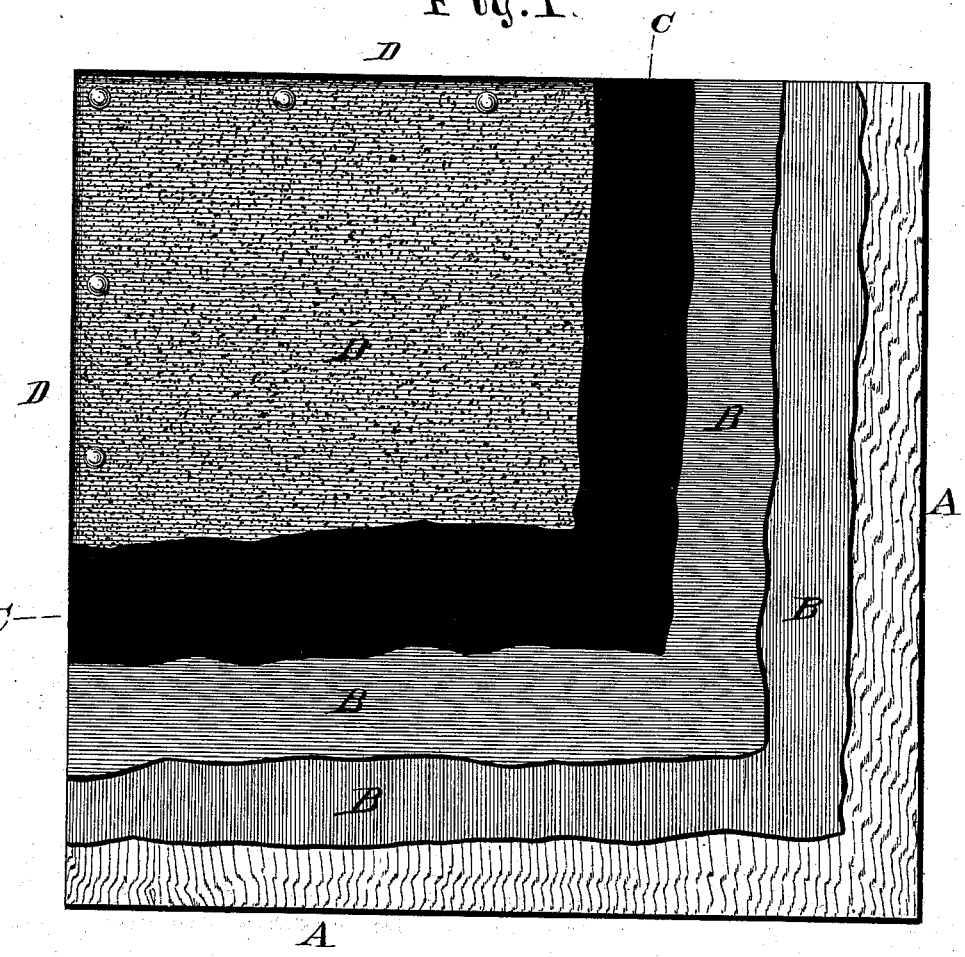
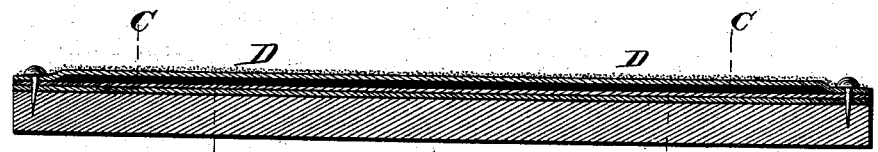

UNITED STATES PATENT OFFICE.

LEWIS PEIRCE, OF SALEM, MASSACHUSETTS.

IMPROVEMENT IN ROOFINGS.

Specification forming part of Letters Patent No. 205,132, dated June 18, 1878; application filed May 18, 1878.

*To all whom it may concern:*

Be it known that I, LEWIS PEIRCE, of Salem, in the county of Essex and State of Massachusetts, have invented certain new and useful Improvements in Roofings; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to elastic fire-proof roofing, and is intended as an improvement upon Letters Patent Nos. 179,131 and 197,170, granted to me, respectively, June 27, 1876, and November 13, 1877; and the nature of my invention consists in inclosing a layer of cement perfectly air-tight between a bottom layer of tar-paper and prepared cloth and a top layer of prepared cloth, as will be hereinafter more fully set forth.

In the annexed drawings, Figure 1 is a plan view of a portion of a roof embodying my invention. Fig. 2 is a central vertical section of the same.

A represents the sheathing of the roof, upon which is placed and fastened a layer, B, consisting of one ply of tar-paper and one ply of prepared cloth. This cloth is prepared by saturating it in a compound consisting of pine-tar, pitch, rosin, and tallow, and immediately after saturating the cloth, and while it is still hot, the cloth is covered with finely-powdered steatite, as described in my Patent No. 179,131. The layer B is then covered with a layer, C, of a cement composed of coal-tar, pine-tar, pitch, rosin, tallow, charcoal, plaster-of-paris, and coal-ashes, also as described in my Patent No. 179,131, and this cement is covered with sand. The sand is swept over the cement, so that the cement will take all the sand possible. The cement layer C is then covered with a layer, D, of one ply of prepared cloth, and the whole finished off with cement and sand.

The object of my present invention is to keep life in the material; and this I accomplish by shutting up the layer C of cement perfectly air-tight, which prevents evaporation, drying, and cracking. Whatever the climate may be, the cement and sand layer remains the same. However hard the surface may get, this layer C yields to it readily, and also holds and gives life to the prepared cloth. The compound remains liquid, so that life cannot get out of it.

I am aware that a roofing has been made consisting of a layer of paper and a layer of cement on top thereof, and such cement layer provided with a water-proof coating, and I do not claim such as my invention.

I am also aware that a roofing has been made composed of a hardening cement interposed between two layers of felt, and I do not claim such as my invention.

Having thus fully described my invention, what I claim as new, and desire to secure by Letters Patent, is—

In plastic roofing, the combination of a bottom layer, B, of tar-paper and prepared cloth, a thick intermediate bituminous cement layer, C, and a top layer, D, of prepared cloth, whereby the cement becomes inclosed air-tight and the roofing retains its plastic nature, substantially as herein set forth.

In testimony that I claim the foregoing as my own I have hereto affixed my signature in presence of two witnesses.

LEWIS PEIRCE.

Witnesses:
   G. L. STREETER,
   WM. S. NICHOLS.